United States Patent
Ishigami et al.

(10) Patent No.: US 6,856,903 B2
(45) Date of Patent: Feb. 15, 2005

(54) APPARATUS FOR DETERMINING THE BEHAVIOR OF A VEHICLE

(75) Inventors: Tadatomi Ishigami, Tokyo (JP); Makoto Mikuriya, Tokyo (JP); Mitsuo Shimotani, Tokyo (JP); Teruki Akamatsu, Tokyo (JP); Toshiyuki Matsuo, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 10 days.

(21) Appl. No.: 10/372,944

(22) Filed: Feb. 26, 2003

(65) Prior Publication Data
US 2003/0163255 A1 Aug. 28, 2003

(30) Foreign Application Priority Data
Feb. 28, 2002 (JP) ........................................ 2002-054370

(51) Int. Cl.[7] .............................................. G01C 21/26
(52) U.S. Cl. ........................ 701/213; 701/214; 701/216; 701/300; 340/988; 342/357.06; 342/357.08; 342/357.09
(58) Field of Search .............................. 701/1, 36, 213, 701/214, 215, 216, 300; 340/988, 991, 992; 342/357.01, 357.06, 357.07, 357.08, 357.09

(56) References Cited

U.S. PATENT DOCUMENTS

| 3,845,289 A | * | 10/1974 | French ...................... 701/117 |
| 5,058,023 A | | 10/1991 | Kozikaro |
| 5,416,712 A | * | 5/1995 | Geier et al. ................ 701/216 |
| 5,745,868 A | | 4/1998 | Geier |
| 5,928,295 A | | 7/1999 | Geier |
| 6,230,100 B1 | | 5/2001 | Geier |

OTHER PUBLICATIONS

Ishigami, Tadatomi, et al., "Multiple Sensor Fusion for a Vehicle Positioning System", 6th World Congress on ITS, Toronto, Nov. 8–12, 1999, Paper No. 3029, pp. 1–8.

* cited by examiner

Primary Examiner—Gertrude A. Jeanglaude
(74) Attorney, Agent, or Firm—Leydig, Voit & Mayer, Ltd.

(57) ABSTRACT

Location equipment includes a calibration unit for calibrating scale factors used for calculating distances traveled by left and right wheels of a vehicle from pulse signals delivered from wheel sensors respectively installed in the left and right wheels, based on global positioning satellite signals received by a GPS receiver, and an estimation unit for estimating vehicle position and movement from the GPS signals received by the GPS receiver and the pulse signals delivered from the wheel sensors, using the scale factors calibrated by the calibration unit.

17 Claims, 6 Drawing Sheets

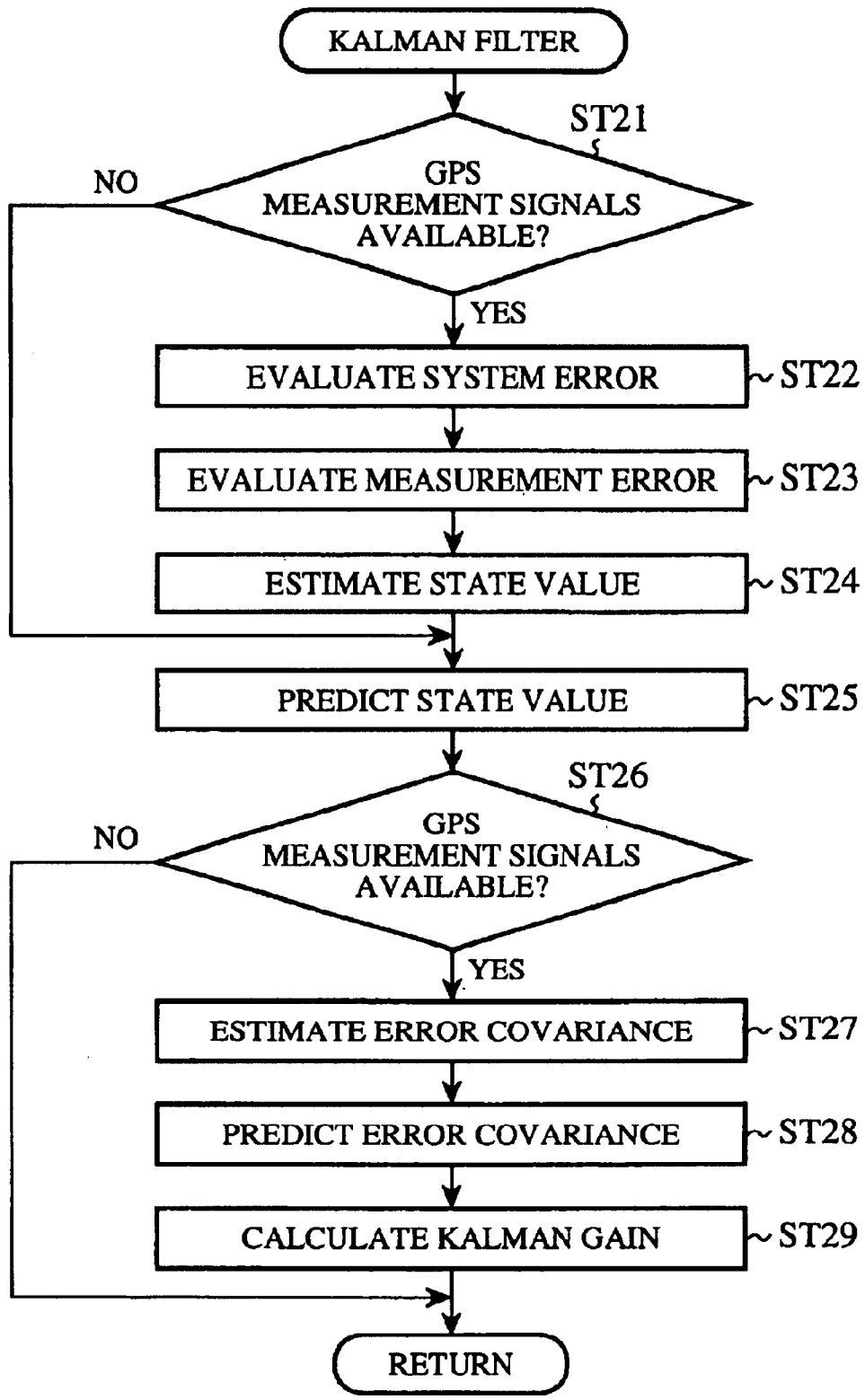

FIG.8

| | CRITERIA BY WHICH TO JUDGE WHETHER GPS MEASUREMENT SIGNALS ARE AVAILABLE |
|---|---|
| (1) | WHETHER 2-D OR 3-D POSITIONING IS BEING DONE |
| (2) | WHETHER DOP VALUE IS EQUAL TO OR LESS THAN PREDETERMINED VALUE |
| (3) | WHETHER GPS VELOCITY IS EQUAL TO OR GREATER THAN PREDETERMINED VALUE |
| (4) | WHETHER CHANGE IN GPS VELOCITY SHOW THE SAME TENDENCY AS CHANGES IN LEFT AND RIGHT WHEEL SENSOR PULSE COUNTS |

FIG.9

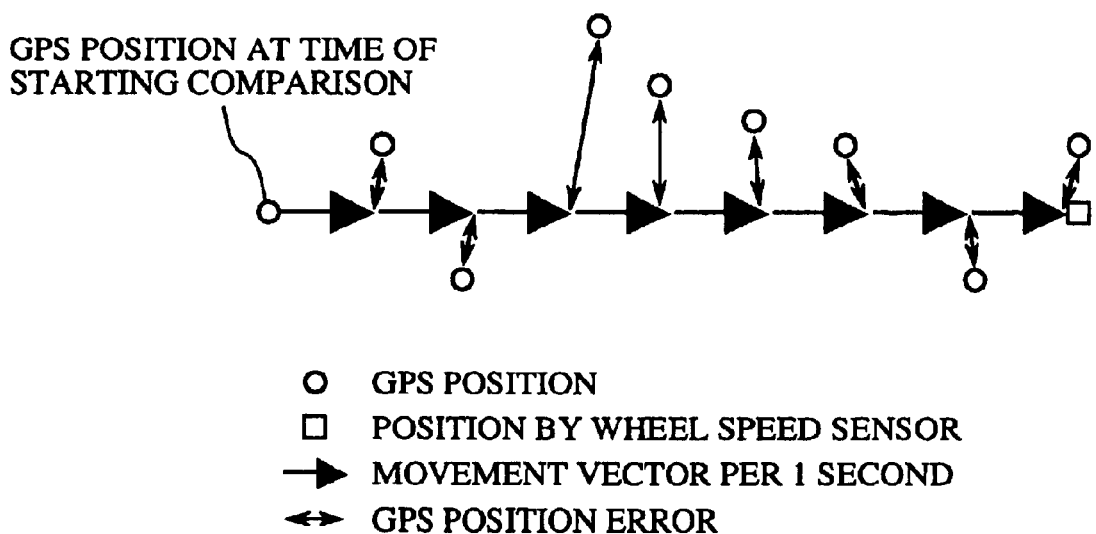

○ GPS POSITION
□ POSITION BY WHEEL SPEED SENSOR
→ MOVEMENT VECTOR PER 1 SECOND
↔ GPS POSITION ERROR

APPARATUS FOR DETERMINING THE BEHAVIOR OF A VEHICLE

BACKGROUND OF THE INVENTION

1. Field of the Invention

The present invention relates to a location equipment for measuring vehicle position (latitude, longitude) and movement (heading, velocity).

2. Description of Related Art

The global positioning satellite (GPS) signal from satellites is frequently blocked and/or reflected in the urban canyons with tall buildings or in a tunnel. In these environments with a few GPS satellites in view, the GPS receiver as part of the vehicle navigation equipment and so on may not measure the vehicle position well. Errors in calculated vehicle position and heading can also increase.

One of cost effective solutions to this problem is to augment the GPS receiver with Dead-Reckoning (DR) system, to fill in the gaps occurring as a result of loss of GPS coverage, and to improve the accuracy, the continuity and variation of the GPS trajectory.

For example, when wheel sensors as part of the Anti-locking Breaking System (ABS) for the control of the body of the vehicle have been installed in the vehicle, a DR system may take signals from the left and right wheel sensors. In this case, an integrated GPS/DR vehicular location equipment uses the average speed of each wheel to determine the vehicle velocity and the vehicle distance traveled, and uses the wheel speed difference divided by the distance between the wheels (referred to as the wheel track) to determine changes in the vehicle heading.

However, in the case of a DR system based on wheel sensors, errors in the calculated distance traveled and changes in vehicle heading may occur due to a difference in tire circumferences between the left wheel and right wheel, slipping or skipping of tire, abrasion of a tire, air pressure of the tires, and conditions of road surface (i.e., the angle of bank, ruts). Conventionally, for escaping these cause of errors and improving the accuracy of the calculated distance traveled and changes in vehicle heading, it must calibrate scale factors which represent the distance of movement per output pulse of the wheel sensor.

FIG. 10 is a block diagram showing the structure of a prior art location equipment disclosed in Japanese patent application publication (TOKUHYO) No. 2000-514195, for example. In the figure, reference numeral 1 denotes GPS satellites, reference numeral 2 denotes an GPS antenna, reference numeral 3 denotes a GPS receiver that receives GPS signals sent from the GPS satellites, reference numeral 4 denote wheel sensors installed in right and left wheels of a vehicle, each for generating a pulse signal as a corresponding wheel rotates, reference numeral 5 denotes a DR processor that continuously calibrates the difference between the scale factors associated with the right and left wheels by assuming that either one of the scale factors associated with the left and right wheels is correct, and that calculates the distance traveled by the vehicle and changes in the vehicle heading from the pulse signals delivered from the wheel sensors 4 by using the scale factors associated with the left and right wheels and reference numeral 6 denotes an application-specific device for identifying the position of the vehicle on a road.

Next, a description will be made as to an operation of the prior art location equipment. First of all, the DR processor 5 calculates a distance D traveled by the vehicle and change $\Delta\theta$ in the vehicle heading from the pulse signals delivered from the wheel sensors 4 by using the following differential scale factor $SF_{ratio}$ and nominal scale factor $SF_{nom}$ according to the following equation.

$$D_L = P_L \cdot SF_{nom}/SF_{ratio}$$

$$D_R = P_R \cdot SF_{nom}$$

$$D = (D_L + D_R)/2$$

$$\Delta\theta = (D_L - D_R)/\text{Tred}$$

where $D_L$ is the distance traveled by the left wheel, $D_R$ is the distance traveled by the right wheel, $P_L$ is an accumulated pulse count from the left wheel sensor 4, $P_R$ is an accumulate pulse count from the right wheel sensor 4, $SF_{nom}$ is the nominal scale factor, $SF_{ratio}$ is an estimated ratio of the scale factors between the left and right wheels (i.e., the differential scale factor), and Tred is the wheel track of the vehicle.

The differential scale factor $SF_{ratio}$ is initialized to one when the location equipment is first installed in the vehicle and, after that, the DR processor 5 continuously updates the differential scale factor $SF_{ratio}$ by using a differential scale factor filter.

In other words, the DR processor 5 continuously calibrates the differential scale factor $SF_{ratio}$ by assuming that either one of the scale factors associated with the left and right wheels, i.e., the nominal scale factor, is correct.

As a result, when the measurement error induced by the GPS receiver 3 is large, the prior art location equipment can reduce the decrease in the accuracy of the measured position of the vehicle by using the calculation results from the DR processor 5.

While the prior art location equipment constructed as mentioned above can calibrate the differential scale factor $SF_{ratio}$ when either one of the scale factors associated with the left and right wheels is correct, the prior art location equipment cannot accurately calibrate the differential scale factor $SF_{ratio}$ and therefore cannot accurately measure the vehicle position (latitude, longitude) and movement (heading, velocity) when errors are involved in both of the scale factors associated with the left and right wheels.

Another problem is that errors involved in the scale factors associated with the left and right wheels, the slipping of the two tires, the angle of bank of the road surface, ruts in the road, or the like produce an error involved in the distance traveled by the vehicle and an error involved in the change in the heading of the vehicle, which have been measured by using the wheel sensors, and therefore errors involved in the position and heading of the vehicle gradually grow in the dead-reckoning navigation method of updating the position and heading of the vehicle by accumulating distances traveled by the vehicle and changes in the heading of the vehicle. Further problems arise when switching between the position and heading of the vehicle determined by using the dead-reckoning navigation method and those determined from the GPS signals from the GPS receiver and when integrating those pieces of information with each other.

SUMMARY OF THE INVENTION

The present invention is proposed to solve the above-mentioned problems, and it is therefore an object of the present invention to provide a location equipment that can measure vehicle position and movement with a high degree of accuracy.

In accordance with an aspect of the present invention, there is provided a location equipment including a calibration unit for calibrating scale factors used for calculating the distances traveled by left and right wheels of a vehicle from pulse signals delivered from wheel sensors respectively installed in the left and right wheels based on GPS signals received by a GPS receiver, and an estimation unit for estimating vehicle position and movement from the GPS signals received by the GPS receiver and the pulse signals delivered from the wheel sensors by using the scale factors calibrated by the calibration unit. As a result, the location equipment can measure the vehicle position and movement with a high degree of accuracy.

Further objects and advantages of the present invention will be apparent from the following description of the preferred embodiments of the invention as illustrated in the accompanying drawings.

BRIEF DESCRIPTION OF THE DRAWINGS

FIG. 7 is a flow chart showing detailed processing performed by a Kalman filter which a wheel sensor calibration unit and a vehicle position and movement estimation unit use;

FIG. 8 is an explanatory drawing showing criteria by which to judge whether the GPS measurement signals can be used;

FIG. 9 is a diagram showing calculation of position errors included in an error involved in measurement results obtained using the GPS measurement signals.

DETAILED DESCRIPTION OF THE PREFERRED EMBODIMENTS

The invention will now be described with reference to the accompanying drawings.

Embodiment 1

Figure 1:
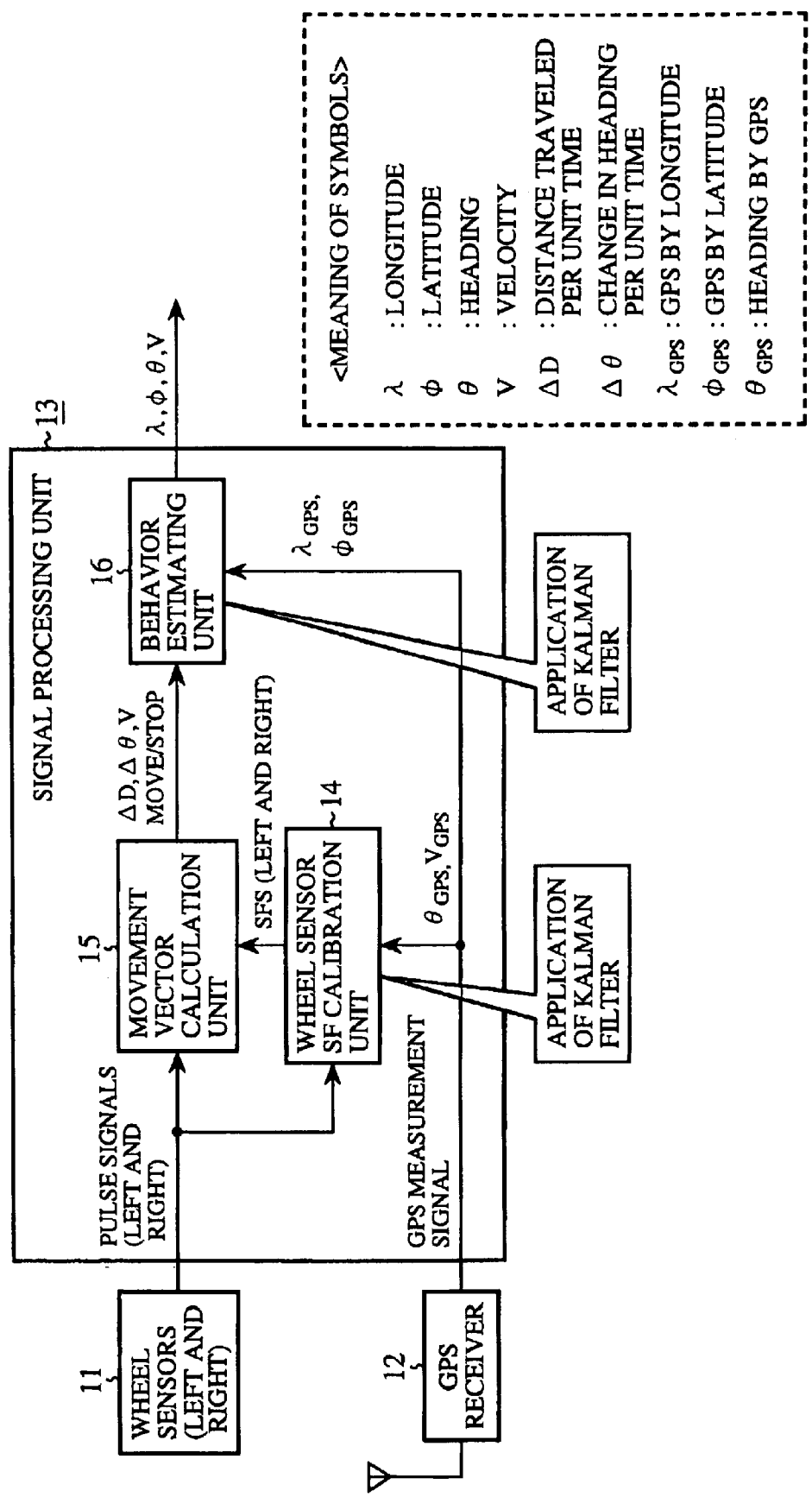
FIG. 1 is a block diagram showing the structure of a location equipment according to embodiment 1 of the present invention.

FIG. 1 is a block diagram showing the structure of a location equipment according to embodiment 1 of the present invention. In the figure, reference numeral 11 denotes wheel sensors installed in left and right wheels of a vehicle, each for generating a pulse signal as a corresponding wheel rotates, reference numeral 12 denotes a GPS receiver for receiving GPS measurement signals sent from GPS satellites, reference numeral 13 denotes a signal processing unit for calculating the vehicle position (latitude, longitude) and movement (heading, velocity) according to a control program prestored in a memory, reference numeral 14 denotes a wheel sensor SF calibration unit (calibration means) for calibrating scale factors used for calculating the distances traveled by the left and right wheels from pulse signals delivered from the wheel sensors 11 based on the GPS measurement signals received by the GPS receiver 12, reference numeral 15 denotes a movement vector calculation unit for calculating a movement vector from the pulse signals delivered from the wheel sensors 11 by using the scale factors calibrated by the wheel sensor SF calibration unit 14, and reference numeral 16 denotes a vehicle position and movement estimation unit for estimating the vehicle position (latitude, longitude) and movement (heading, velocity) from the movement vector calculated by the movement vector calculation unit 15 and the GPS measurement signals received by the GPS receiver 12. An estimating means can be provided with the movement vector calculation unit 15 and the vehicle position and movement estimation unit 16.

Figure 2:
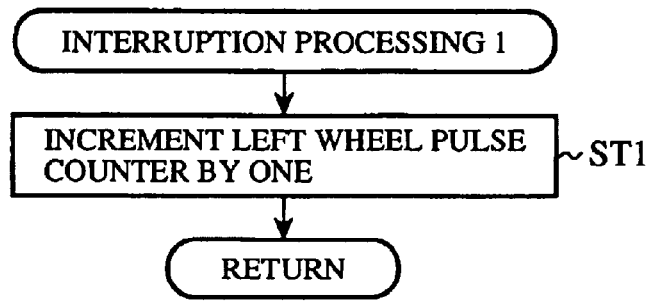
FIG. 2 is a flow chart showing an interruption process performed by the location equipment according to embodiment 1 when a pulse signal is delivered from a left wheel sensor.
Figure 3:
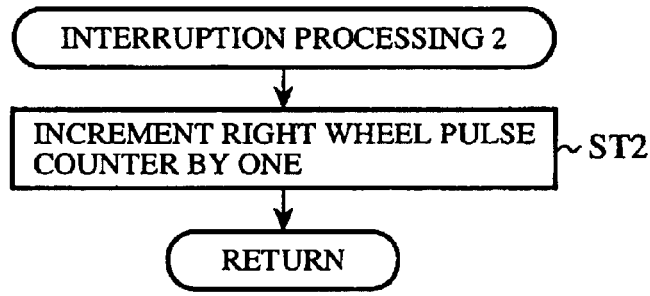
FIG. 3 is a flow chart showing an interruption process performed by the location equipment according to embodiment 1 when a pulse signal is delivered from a right wheel sensor.
Figure 4:
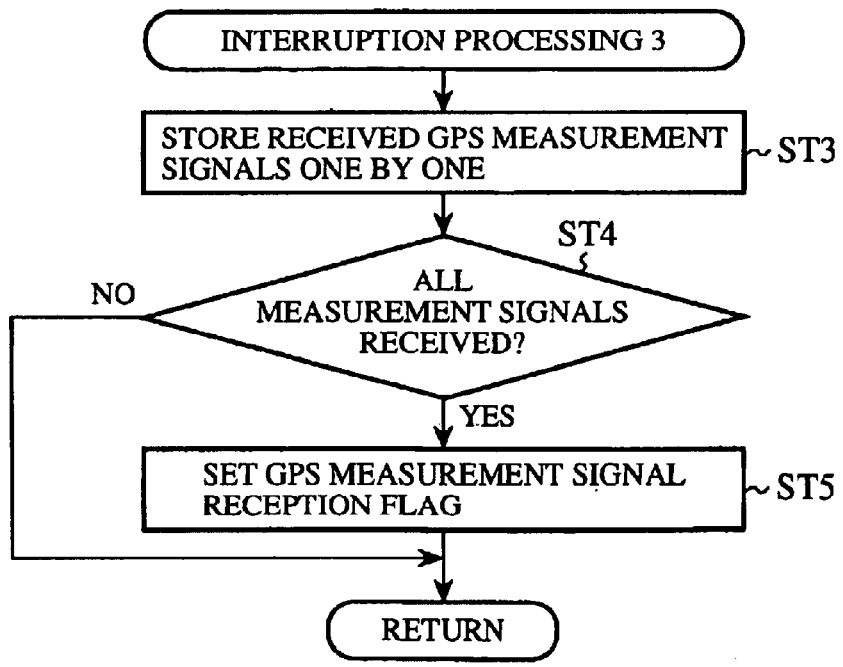
FIG. 4 is a flow chart showing an interruption process of receiving GPS measurement signals delivered from a GPS receiver at predetermined intervals (e.g., fixed intervals of about one second)
Figure 5:
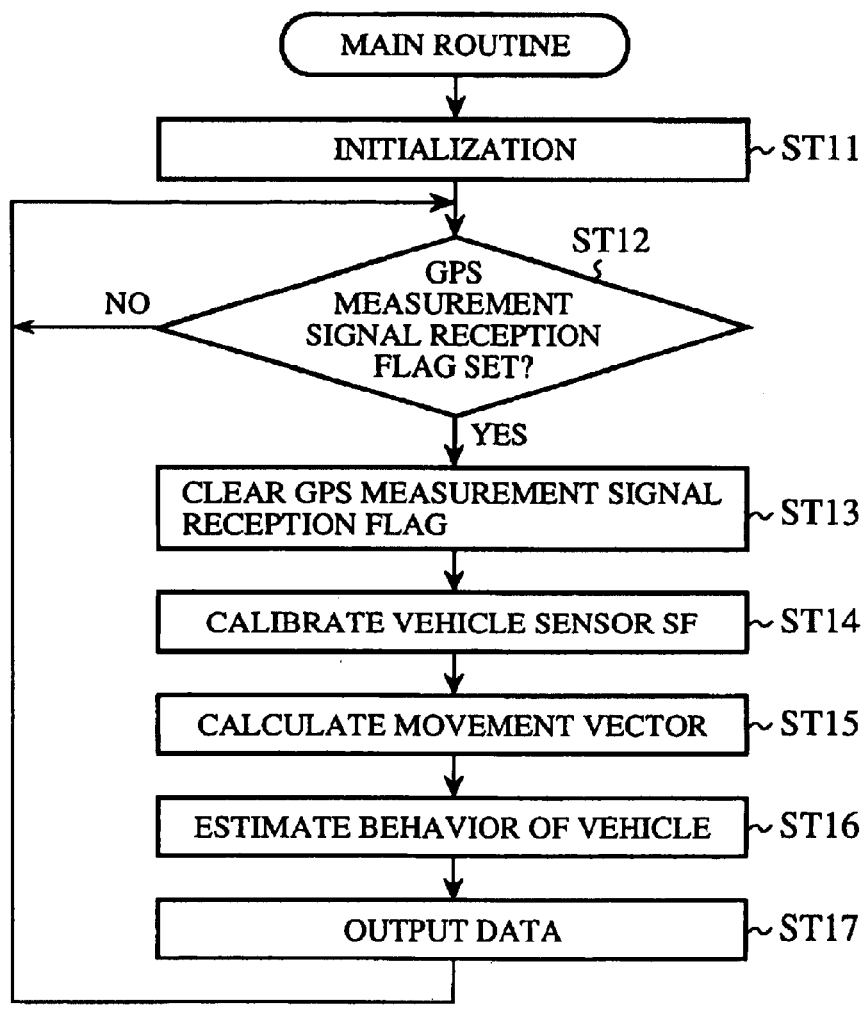
FIG. 5 is a flowchart showing the contents of a main routine.
Figure 6:
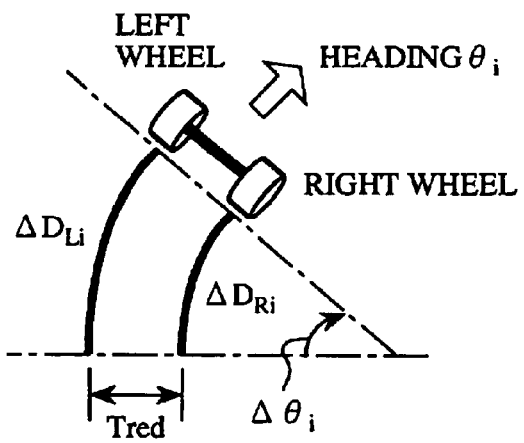
FIG. 6 is an explanatory drawing showing a model for calculating a change in the vehicle heading from the pulse signals from the left and right wheel sensors.
Figure 10:
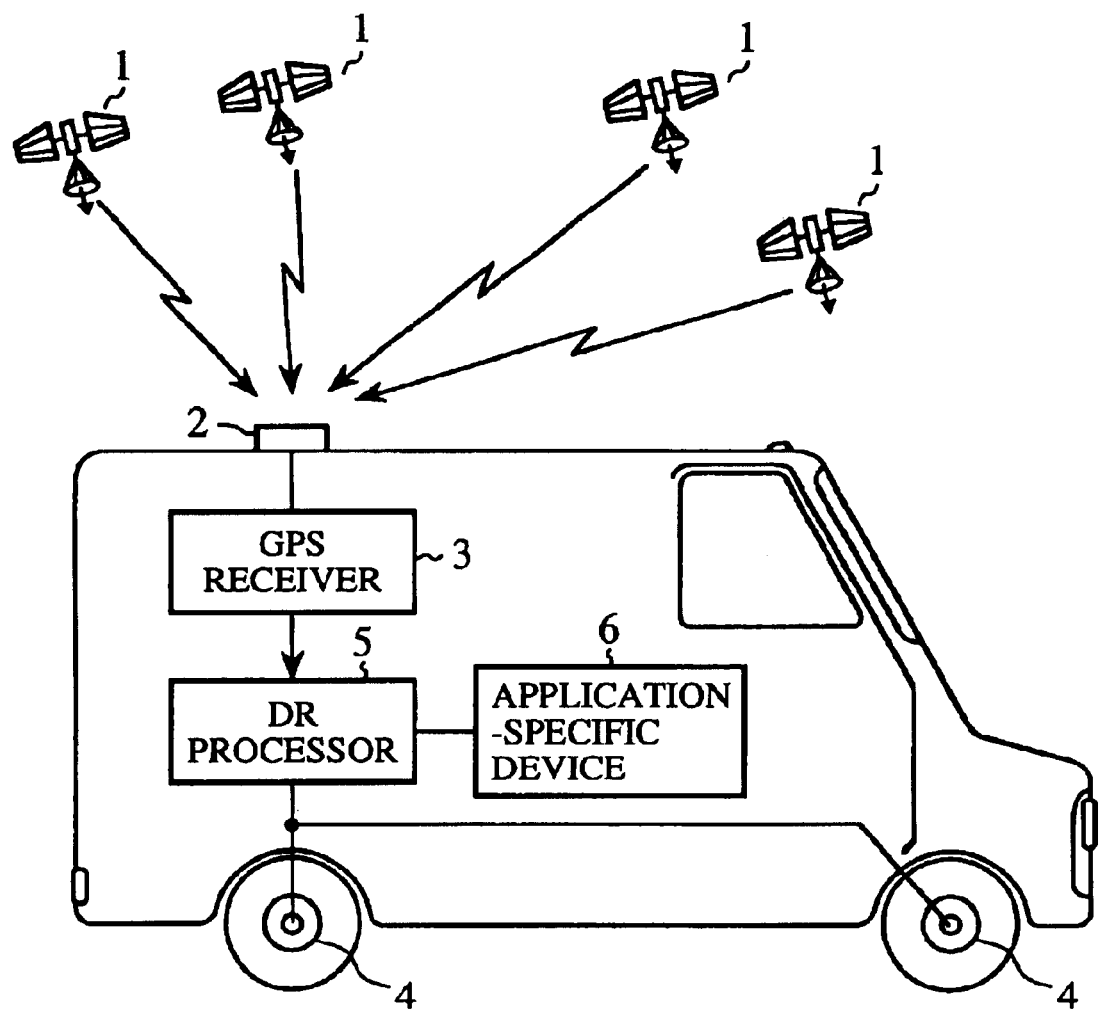
FIG. 10 is a block diagram showing the structure of a prior art location equipment.

FIG. 2 is a flow chart showing an interruption process 1 performed by the location equipment according to embodiment 1 of the present invention when a pulse signal is delivered from the left wheel sensor 11, FIG. 3 is a flow chart showing an interruption process 2 performed by the location equipment according to embodiment 1 of the present invention when a pulse signal is delivered from the right wheel sensor 11, FIG. 4 is a flow chart showing an interruption process 3 of receiving the GPS measurement signals delivered from the GPS receiver 12 at predetermined intervals (e.g., fixed intervals of about one second), FIG. 5 is a flow chart showing the contents of a main routine, FIG. 6 is an explanatory drawing showing a model for calculating a change in the vehicle heading from the pulse signals from the left and right wheel sensors 11, FIG. 7 is a flow chart showing detailed processing performed by a Kalman filter which the wheel sensor SF calibration unit 14 and the vehicle position and movement estimation unit 16 use, and FIG. 8 is an explanatory drawing showing criteria by which to judge whether the GPS measurement signals can be used.

Next, a description will be made as to an operation of the location equipment according to embodiment 1 of the present invention. An interruption process performed by the signal processing unit 13 will be explained first. First of all, when a pulse signal is delivered from the left wheel sensor 11, the signal processing unit 13 accepts an interruption in response to a falling edge of the pulse signal and increments a left wheel pulse counter (i.e. a free running counter) not shown in the figure by only one (in step ST1). When a pulse signal is delivered from the right wheel sensor 11, the signal processing unit 13 accepts an interruption in response to a rising edge of the pulse signal and increments a right wheel pulse counter (i.e., a free running counter) not shown in the figure by only one (in step ST2).

Furthermore, when the GPS receiver 12 delivers the GPS measurement signals (i.e., signals indicating GPS times, GPS longitudes, GPS latitudes, GPS headings, GPS velocities, DOPs, and positioning dimensions, and so on) to the signal processing unit 13, the signal processing unit 13 accepts an interruption and receives the GPS measurement signals one by one and stores them therein (in step ST3). The GPS measurement signals are delivered to the signal processing unit 13 at fixed intervals of about one second. When completing the reception of the GPS measurement signals (in step ST4), the signal processing unit 13 sets a GPS measurement signal reception flag indicating the completion of the reception of the GPS measurement signals (in step ST5).

Next, the main routine performed by the signal processing unit 13 will be explained. First of all, the signal processing unit 13 initializes all processes (in step ST11), and determines whether or not it is time to estimate the vehicle position and movement by referring to the GPS measurement signal reception flag (in step ST12). In other words, if the GPS measurement signal reception flag is set, the signal processing unit 13 determines that it is time to estimate the vehicle position and movement. The signal processing unit 13 then clears this flag for the next processing (in step ST13). In contrast, unless the GPS measurement signal reception flag is set, the signal processing unit 13 determines that it is not time to estimate the vehicle position and movement and waits on standby until the flag is set.

When the signal processing unit 13 determines that it is time to estimate the vehicle position and movement, the wheel sensor SF calibration unit 14 of the signal processing unit 13 calibrates the scale factors SF used for calculating the distances traveled by the left and right wheels from the pulse signals delivered from the wheel sensors 11 based on the GPS measurement signals received by the GPS receiver 12 (in step ST14).

Hereafter, the process of calibrating the scale factors SF will be explained concretely. The wheel sensor SF calibration unit 14 calibrates the scale factors $SF_{Li}$ and $SF_{Ri}$ associated with the left and right wheels by using a Kalman filter. This Kalman filter is designed based on a model (i.e., a system model) for calculating the velocity $V_i$ and heading $\theta'_i$ (which is obtained by adding the change $\Delta\theta_i$ in the heading to an initial bearing) of the vehicle, and the scale factors $SF_{Li}$ and $SF_{Ri}$ associated with the left and right wheels from count increments $\Delta P_{Li}$ and $\Delta P_{Ri}$ in the numbers of pulses included in the pulse signals from the left and right wheel sensors 11, and another model (i.e., a measurement model) for secondarily calibrating the scale, factors $SF_{Li}$ and $SF_{Ri}$ associated with the left and right wheels during a process of gradually bringing the velocity $V_i$ and heading $\theta'_i$ of the vehicle calculated by the system model close to the GPS velocity $V_{GPSi}$ delivered from the GPS receiver 12 and the heading $\theta_i$ calculated in step ST16, which will be described later, respectively.

These system model and measurement model can be associated with each other by using the following state equation (1) and measurement equation (2). In addition, both the equations can be integrated into a Kalman filter equation (3).

$$x_{i+1} = F_i x_i + G_i \omega_i \qquad (1)$$

$$x_i = [V_i, \theta'_i, SF_{Li}, SF_{Ri}]^T$$

$$F_i = \begin{pmatrix} 1 & 0 & (\Delta P_{Li} - \Delta P_{Li-1})/(2 \times \Delta t) & (\Delta P_{Ri} - \Delta P_{Ri-1})/(2 \times \Delta t) \\ 0 & 1 & \Delta P_{Li}/Tred & -\Delta P_{Ri}/Tred \\ 0 & 0 & 1 & 0 \\ 0 & 0 & 0 & 1 \end{pmatrix}$$

$$G_i = \begin{pmatrix} 1 & 0 \\ 0 & 1 \\ 2 \times \Delta t / \Delta P_{Li} & Tred/(2 \times \Delta P_{Li}) \\ 2 \times \Delta t / \Delta P_{Ri} & -Tred/(2 \times \Delta P_{Ri}) \end{pmatrix}$$

$$\omega_i = [\delta V_i, \delta\theta'_i]^T$$

$$y_i = H x_i + v_i \qquad (2)$$

$$y_i = [V_{GPSi}, \theta_i]^T$$

$$v_i = [\delta V_{GPSi}, \delta\theta_i]^T$$

$$H = \begin{pmatrix} 1 & 0 & 0 & 0 \\ 0 & 1 & 0 & 0 \end{pmatrix}$$

$$x_{i|i} = x_{i|i-1} + K_i \{y_i - (H x_{i|i-1} + v_i)\} \qquad (3)$$

$$x_{i+1|i} = F_i x_{i|i} + G_i \omega_i$$

$$\Sigma_{i|i} = \Sigma_{i|i-1} - K_i H \Sigma_{i|i-1}$$

$$\Sigma_{i+1|i} = F_i \Sigma_{i|i} F_i^T + G_i \Sigma_{\omega i} G_i^T$$

$$K_i = \Sigma_{i|i-1} H^T [H \Sigma_{i|i-1} H^T + \Sigma_{vi}]^{-1}$$

$$\Sigma_{\omega i} = \begin{pmatrix} \sigma_{Vi}^2 & 0 \\ 0 & \sigma_{\theta'i}^2 \end{pmatrix}$$

$$\Sigma_{vi} = \begin{pmatrix} \sigma_{VGPSi}^2 & 0 \\ 0 & \sigma_{\theta i}^2 \end{pmatrix}$$

where $x_i$, $F_i$, $G_i$, $\omega_i$, $y_i$, and $v_i$ are a state value matrix, a state transition matrix, a driving matrix, a state value error matrix, a measurement value matrix, and a measurement value error matrix, and H is a measurement matrix. $\delta V_i$ and $\delta\theta'_i$ that are elements of the state value error matrix $\omega_i$ are errors involved in the velocity $V_i$ and heading $\theta'_i$ of the vehicle, respectively, and $\delta V_i$ is determined as a predetermined ratio of the velocity $V_i$ of the vehicle and $\delta\theta'_i$ is determined as a per-pulse change in the heading of the vehicle that is equal to the difference between the count increments in the numbers of pulses included in the pulse signals of the left and right wheel sensors 11.

$\delta V_{GPSi}$ and $\delta\theta'_i$ that are elements of the measurement value error matrix $v_i$ are the standard deviation of the GPS velocity and an error involved in the heading of the vehicle that is determined in step ST16 of estimating the vehicle position and movement, which will be described later, respectively. $x_{i|i}$, $\Sigma_{i|i}$ and $K_i$ are a state value, an estimation of the error covariance, and a Kalman gain at the current discrete time i, and $x_{i+1|i}$ and $\Sigma_{i+1|i}$ are a state value and an estimation of the error covariance at the next discrete time i+1, which are predicted at the current discrete time i. In addition, $\Sigma_{vi}$ is a covariance matrix of measurement error, and $\Sigma_{\omega i}$ is a covariance matrix of system error. Because each element of each of these matrices is determined by calculating a determinant of the corresponding matrix, the explanation of those matrices will be omitted.

While the vehicle stops, the wheel sensor SF calibration unit 14 sets the speed of the state matrix at the current discrete time i to 0, and assumes that the heading of the vehicle that is determined at the time of the estimation of the vehicle position and movement is the heading of the vehicle, in step ST16 which will be described later, so as to reset the state value matrix. On the other hand, while the vehicle does not stop and is moving, the wheel sensor SF calibration unit 14 carries out the Kalman filter processing as shown in FIG. 7.

In other words, the wheel sensor SF calibration unit 14 judges whether the GPS measurement signals can be used to calibrate the scale factors according to criteria, as shown in FIG. 8, by which to judge whether the GPS measurement signals can be used (in step ST21). Then, if the wheel sensor SF calibration unit 14 determines that the GPS measurement signals can be used to calibrate the scale factors, it advances to step ST22. Otherwise, the wheel sensor SF calibration unit 14 advances to step ST25. When determining that the GPS measurement signals can be used to calibrate the scale factors, the wheel sensor SF calibration unit 14 calculates the error $\delta V_i$ involved in the velocity $V_i$ of the vehicle and the error $\delta\theta'_i$ involved in the heading $\theta'_i$ of the vehicle, which are system errors (in step ST22).

The wheel sensor SF calibration unit 14 then defines the standard deviation $\delta V_{GPSi}$ of the GPS velocity, which is a measurement error, and the error $\delta\theta'_i$ involved in the heading of the vehicle, which is determined at the time of the estimation of the vehicle position and movement in step ST16, as described later (in step ST23). After that, the wheel sensor SF calibration unit 14 calculates an estimation $x_{i|i}$ of the state value at the current discrete time i (in step ST24), and calculates a predicted value $x_{i+1|i}$ of the state value at the next discrete time i+1 (in step ST25).

The wheel sensor SF calibration unit 14 judges whether the GPS measurement signals can be used to calibrate the scale factors based on the judgment result in step ST21 (in step ST26). The wheel sensor SF calibration unit 14 then advances to step ST27 when the GPS measurement signals can be used to calibrate the scale factors. The wheel sensor SF calibration unit 14 finishes the process of updating the wheel sensor scale factors otherwise.

When determining that the GPS measurement signals can be used to calibrate the scale factors, the wheel sensor SF calibration unit 14 calculates an estimation $\Sigma_{i|i}$ of the error covariance at the current discrete time i (in step ST27), and calculates a predicted value $\Sigma_{i+1|i}$ of the error covariance (in step ST28). The wheel sensor SF calibration unit 14 then calculates the Kalman gain $K_i$ at the current discrete time i (in step ST29). The above processing is thus carried out by the wheel sensor SF calibration unit 14.

After the wheel sensor SF calibration unit 14 calibrates the scale factors $SF_{Li}$ and $SF_{Ri}$, as previously mentioned, the movement vector calculation unit 15 of the signal processing unit 13 calculates a movement vector (i.e., the distance traveled $\Delta D_i$ by the vehicle and the change $\Delta\theta_i$ in the heading) from the pulse signals delivered from the left and right wheel sensors 11 by using the scale factors $SF_{Li}$ and $SF_{Ri}$ (in step ST15).

Concretely, the movement vector calculation unit 15 of the signal processing unit 13 carries out the following processing. First of all, the movement vector calculation unit 15 determines the count increments $\Delta P_{Li}$ and $\Delta P_{Ri}$ from the count values of the wheel pulse counters (i.e., the free-running counters) that have counted up pulses during the above-mentioned interruption processes 1 and 2 at intervals that the GPS measurement signals are applied to the signal processing unit 13, and calculates the distances $\Delta D_{Li}$ and $\Delta D_{Ri}$ respectively traveled by the left and right wheels from the count increments $\Delta P_{Li}$ and $\Delta P_{Ri}$ in the numbers of pulses included in the pulse signals as follows.

$$\Delta D_{Li} = \Delta P_{Li} \cdot SF_{Li}$$

$$\Delta D_{Ri} = \Delta P_{Ri} \cdot SF_{Ri}$$

The movement vector calculation unit 15 then calculates the distance traveled $\Delta D_i$ by the vehicle and the change $\Delta\theta_i$ in the heading of the vehicle from the distances $\Delta D_{Li}$ and $\Delta D_{Ri}$ respectively traveled by the left and right wheels as follows (see FIG. 6), where Tred is the distance between the left and right wheels (i.e., the wheel track).

$$\Delta D_i = (\Delta D_{Li} + \Delta D_{Ri})/2$$

$$\Delta\theta_i = (\Delta D_{Li} - \Delta D_{Ri})/\text{Tred}$$

When the movement vector calculation unit 15 calculates the movement vector, the vehicle position and movement estimation unit 16 of the signal processing unit 13 estimates the vehicle position and movement from the movement vector and the GPS measurement signals received by the GPS receiver 12 (in step ST16), and outputs the estimated result (in step ST17).

The process of estimating the vehicle position and movement will be concretely explained hereafter. The vehicle position and movement estimation unit 16 calculates the current position ($\lambda_i$, $\phi_i$) and heading $\theta_i$ of the vehicle by using a Kalman filter different from that used by the wheel sensor SF calibration unit 14. In other words, the vehicle position and movement estimation unit 16 is based on the system model given by equation (4), for calculating the current position ($\lambda_i$, $\phi_i$) and heading $\theta_i$ of the vehicle from the distance traveled $D_i$ by the vehicle and the change $\Delta\theta_i$ in the heading of the vehicle, and the measurement model given by equation (5) showing the relationship between the vehicle position ($\lambda_i$, $\phi_i$) obtained by this system model and the GPS position ($\lambda_{GPSi}$, $\phi_{GPSi}$) delivered from the GPS receiver 12, and calculates the current position ($\lambda_i$, $\phi_i$) and heading $\theta_i$ of the vehicle according to the state equation (6), the measurement equation (7), and the Kalman filter equation (3).

$$\lambda_i = \lambda_{i-1} + D_i \times \sin\{\theta_{i-1} + \Delta\theta_i\} \times SF_{d\to\lambda} + \delta\lambda_i$$

$$\phi_i = \phi_{i-1} + D_i \times \cos\{\theta_{i-1} + \Delta\theta_i\} \times SF_{d\to\phi} + \delta\phi_i$$

$$\delta\lambda_i = \{\delta D_i \times \sin\theta_i + \delta\Delta\theta_i \times D_i \times \cos\theta_i\} \times SF_{d\to\lambda}$$

$$\delta\phi_i = \{\delta D_i \times \cos\theta_i - \delta\Delta\theta_i \times D_i \times \sin\theta_i\} \times SF_{d\to\phi}$$

$$\sin\{\theta_{i-1} + \Delta\theta_i\} = \cos\theta_{i-1} \cdot \sin\Delta\theta_i + \sin\theta_{i-1} \cdot \cos\Delta\theta_i$$

$$\cos\{\theta_{i-1} + \Delta\theta_i\} = \cos\theta_{i-1} \cdot \cos\Delta\theta_i - \sin\theta_{i-1} \cdot \sin\Delta\theta_i \quad (4)$$

$$\lambda_{Ri} = \lambda_i + \delta\lambda_{Ri}$$

$$\phi_{Ri} = \phi_i + \delta\phi_{Ri} \quad (5)$$

$$x_{i+1} = F_i x_i + G_i \omega_i \quad (6)$$

$$x_i = [\lambda_i, \phi_i, \sin\theta_i, \cos\theta_i]^T$$

$$\omega_i = [\delta D_i, \delta\Delta\theta_i]^T$$

$$F_i = \begin{pmatrix} 1 & 0 & D_{i+1} \cdot \cos\Delta\theta_{i+1} \cdot SF_{d\to\lambda} & D_{i+1} \cdot \sin\Delta\theta_{i+1} \cdot SF_{d\to\lambda} \\ 0 & 1 & -D_{i+1} \cdot \sin\Delta\theta_{i+1} \cdot SF_{d\to\phi} & D_{i+1} \cdot \cos\Delta\theta_{i+1} \cdot SF_{d\to\phi} \\ 0 & 0 & \cos\Delta\theta_{i+1} & \sin\Delta\theta_{i+1} \\ 0 & 0 & -\sin\Delta\theta_{i+1} & \cos\Delta\theta_{i+1} \end{pmatrix}$$

$$G_i = \begin{pmatrix} \sin\theta_i \cdot SF_{d\to\lambda} & D_{i+1} \cdot \cos\theta_i \cdot SF_{d\to\lambda} \\ \cos\theta_i \cdot SF_{d\to\phi} & -D_{i+1} \cdot \sin\theta_i \cdot SF_{d\to\phi} \\ 0 & \cos\theta_i \\ 0 & -\sin\Delta\theta_{i+1} \end{pmatrix}$$

$$y_i = H \cdot x_i + v_i \quad (7)$$

$$y_i = [\lambda_{GPSi}, \phi_{GPSi}]^T$$

$$H = \begin{vmatrix} 1 & 0 & 0 & 0 \\ 0 & 1 & 0 & 0 \end{vmatrix}$$

$$v_i = [\delta\lambda_{GPSi}, \delta\phi_{GPSi}]^T$$

where in equations (4) and (5), i shows the current discrete time, $\lambda_{i-1}$ and $\phi_{i-1}$ are the longitude and latitude of the vehicle position at the previous discrete time i−1, and $\theta_{i-1}$ is the heading of the vehicle at the previous discrete time i−1. $SF_{d\to\lambda}$ and $SF_{d\to\phi}$ are coefficients used for converting the unit of displacements in the direction of longitude and latitude from distance to longitude and latitude, respectively. Furthermore, $\delta\lambda_i$ and $\delta\phi_i$ are errors involved in the longitude and latitude of the vehicle position, respectively, and $\delta\Delta\theta_i$ and $\delta D_i$ are errors involved in $\Delta\theta_i$ and $D_i$, respectively. $\delta\lambda_{GPSi}$ and $\delta\phi_{GPSi}$ are errors involved in the GPS position $\lambda_{GPSi}$ and $\phi_{GPSi}$.

Furthermore, in equations (4) and (5), $x_i$, $F_i$, $G_i$, $w_i$, $y_i$, and $v_i$ are a state vector, a state transition matrix, a driving matrix, a system error, a measurement value, and a measurement error at the current discrete time i, respectively, and H is a measurement matrix. In order to calculate the measurement error $v_i$, the vehicle position and movement estimation unit 16 provides three starting points in latitude and longitude that are shifted for each predetermined section, and determines the difference between the latitude of the vehicle position provided by the GPS receiver 12 and that provided by the Kalman filter and the difference between the longitude of the vehicle position provided by the GPS receiver 12 and that provided by the Kalman filter for each of the three starting points. The vehicle position and movement estimation unit 16 then defines the largest differences in latitude and longitude as the error $\delta\lambda_{GPSi}$ and $\delta\phi_{GPSi}$ involved in the vehicle position ($\lambda_{GPSi}$, $\phi_{GPSi}$) measured by the GPS receiver 12. The vehicle position and movement estimation unit 16 also calculates a predetermined ratio of the distance traveled $D_i$ as the distance error $\delta D_i$ involved in the output signals from the wheel sensors, and calculates a difference between the direction in which the GPS position is moved in a predetermined section and the direction in which the vehicle position is moved in the predetermined section as the bearing error $\delta\Delta\theta_i$.

As can be seen from the above description, in accordance with this embodiment 1, because the location equipment is so constructed as to calibrate the scale factors $SF_{Li}$ and $SF_{Ri}$ used for calculating the distances traveled by the left and right wheels from the pulse signals delivered from the left and right wheel sensors 11 based on the GPS measurement signals received by the GPS receiver 12, the location equipment can measure the vehicle position and movement with a high degree of accuracy. In other words, the location equipment can continuously measure the vehicle position and movement with the left and right wheel sensors 11 even when the vehicle is moving through a tunnel or the like where the location equipment cannot measure the vehicle position with only the GPS receiver 12. Even in city environments with large measurement errors caused by the GPS receiver 12, the location equipment can accurately measure the vehicle position and movement with stability by performing the process of integrating the information from the wheel sensors 11 with the information from the GPS receiver 12.

As previously mentioned, because the wheel sensor SF calibration unit 14 performs the Kalman filter processing so as to calibrate the scale factors associated with the left and right wheels, the location equipment can optimize the distance traveled by the vehicle and the heading of the vehicle which the vehicle position and movement estimation unit 16 uses.

As previously mentioned, because the vehicle position and movement estimation unit 16 performs the Kalman filter processing so as to estimate the vehicle position and movement, the location equipment can optimize results of the estimation of the vehicle position and movement. Furthermore, because the wheel sensor SF calibration unit 14 calibrates the scale factors associated with the left and right wheels from information on either the heading or velocity of the vehicle included in the GPS signals received by the GPS receiver 12, the location equipment can acquire the scale factors associated with the left and right wheels that provide the velocity and heading of the vehicle which are consistent with the GPS position and GPS heading of the vehicle, and therefore can continuously measure the vehicle position and movement with a high degree of accuracy while preventing errors involved in the distance traveled by the vehicle and the change in the heading of the vehicle, which are calculated from the pulse signals from the left and right wheels, from occurring. Furthermore, even if there is a difference between the sizes of the left and right wheels because of the air pressure of tire, wear in tire, or the like, and therefore the per-turn distances traveled by the left and right wheels are not the same, the location equipment can accurately measure the change in the heading of the vehicle from the pulse signals from the left and right wheels.

In accordance with this embodiment 1, the wheel sensor SF calibration unit 14 carries out the Kalman filter processing by using the heading calculated by the Kalman filter processing of the vehicle position and movement estimation unit 16 as the reference heading of the vehicle. As an alternative, the wheel sensor SF calibration unit 14 can carry out the Kalman filter processing by directly using the GPS heading measured by the GPS receiver 12 so as to estimate the scale factors associated with the left and right wheel sensors. The wheel sensor SF calibration unit 14 can perform the calibration process of calibrating the scale factors after verifying the validity of the GPS heading so that the wheel sensor SF calibration unit 14 can calibrate the scale factors associated with the left and right wheel sensors more accurately.

Furthermore, in accordance with this embodiment 1, the movement vector calculation unit 15 directly uses the scale factors associated with the left and right wheel sensors calculated during the Kalman filter processing carried out by the wheel sensor SF calibration unit 14. As an alternative, the movement vector calculation unit 15 can use the scale factors associated with the left and right wheel sensors after they are made to pass through a low-pass filter. As a result, the location equipment can measure the vehicle position and movement with a higher degree of accuracy.

In addition, in accordance with this embodiment 1, the wheel sensor SF calibration unit 14 and the vehicle position and movement estimation unit 16 use different Kalman filters. As an alternative, they can use one integrated Kalman filter. The Kalman filter processing done by each Kalman filter can be based on a system model different from the above-mentioned one and a measurement model different from the above-mentioned one.

Embodiment 2

Mention is not made in above-mentioned embodiment 1 of calculating the probability of occurrence of slipping of the wheels based on the pulse signals from the left and right wheel sensors 11 and the GPS measurement signals received by the GPS receiver 12, and enlarging the Kalman gain that the vehicle position and movement estimation unit 16 uses when the probability of occurrence of slipping of the wheels becomes larger than a reference value, thereby increasing the frequency of measuring the vehicle position and movement by using the GPS measurement signals.

Concretely, in a location equipment in accordance with a second embodiment, when a movement vector calculation unit 15 calculates the distances $\Delta D_{Li}$ and $\Delta D_{Ri}$ traveled by the left and right wheels and then calculates the distance traveled $\Delta D_i$ by the vehicle and a change $\Delta\theta_i$ in the heading of the vehicle, a wheel sensor SF calibration unit 14 calculates the probability $R_{SLIPi}$ of occurrence of slipping of the wheels, like that of above-mentioned embodiment 1. In other words, assuming that slipping occurs according to the angle $\Delta\theta_i$ of the wheels (i.e., the change in the heading of the vehicle) with respect to the heading of the vehicle while the vehicle is accelerated or slowed down, the wheel sensor SF calibration unit 14 calculates the slipping occurrence probability $R_{SLIPi}$ of the wheels as follows.

When $V_{GPSi} \geq V_i$ and $V_{GPSi} > 0$ $$R_{SLIPi} = (V_{GPSi} - V_i \cdot \cos\Delta\theta_i)/V_{GPSi}$$

When $V_{GPSi} < V_i$ and $V_i > 0$ $$R_{SLIPi} = (V_i - V_{GPSi} \cdot \cos\Delta\theta_i)/V_i$$

where $V_{GPSi}$ is the GPS velocity, and $V_i$ is the velocity that is defined as an average of the left and right wheel velocities from the pulse signals from the left and right wheel sensors 11.

The wheel sensor SF calibration unit 14 then calculates a predetermined ratio of the velocity $V_i$ of the vehicle as a velocity error $\delta V_i$, and, after that, adds a value corresponding to the slipping occurrence probability $R_{SLIPi}$ of the wheels to the velocity error $\delta V_i$, like that of above-mentioned embodiment 1. When the slipping occurrence probability $R_{SLIPi}$ of the wheels becomes larger than the predetermined reference value, the wheel sensor SF calibration unit 14 initializes the Kalman filter processing to prevent the scale factors associated with the left and right wheels sensor from being erroneously calibrated in advance.

As a result, because the Kalman gain of the Kalman filter that the vehicle position and movement estimation unit 16 uses grows when the slipping generation probability $R_{SLIPi}$ of the wheels is large, the wheel sensor SF calibration unit 14 brings the vehicle position closer to the GPS position. Therefore, even if the amount of slipping of the wheels increases, the location equipment can estimate the vehicle position and movement with a high degree of accuracy by performing the Kalman filter processing.

As previously mentioned, in accordance with this embodiment 2, the location equipment enlarges the Kalman gain that the vehicle position and movement estimation unit 16 uses when the probability $R_{SLIPi}$ of occurrence of slipping of the wheels becomes larger than the reference value. As an alternative, the wheel sensor SF calibration unit 14 can stop calibrating the scale factors when the probability $R_{SLIPi}$ of occurrence of slipping of the wheels becomes larger than the reference value. After that, when the probability $R_{SLIPi}$ of occurrence of slipping of the wheels becomes smaller than the reference value, the wheel sensor SF calibration unit 14 restarts the calibration of the scale factors. As a result, the location equipment can prevent the scale factors from being erroneously calibrated in advance under circumstances where the slipping of the wheels occurs. In other words, the location equipment can prevent any reduction in the accuracy of the estimation of the vehicle position and movement.

As previously mentioned, in accordance with this embodiment 2, the location equipment calculates the slipping occurrence probability $R_{SLIPi}$ of the wheels from the average of the velocities of the left and right wheels. As an alternative, the location equipment can calculate the slipping occurrence probability of each of the right and left wheels so as to calculate the velocity error $\delta V_i$ and the heading error $\delta\theta'_i$ from the slipping occurrence probabilities associated with the left and right wheels.

Embodiment 3

As previously mentioned, in accordance with above-mentioned embodiment 2, the location equipment calculates the probability of occurrence of slipping of the left and right wheels from the pulse signals from the left and right wheel sensors 11 and the GPS measurement signals received by the GPS receiver 12 and enlarges the Kalman gain that the vehicle position and movement estimation unit 16 uses or stops calibrating the scale factors when the probability $R_{SLIPi}$ of occurrence of slipping of the wheels becomes larger than a reference value. In contrast, a location equipment in accordance with this embodiment 3 calculates a change $\Delta\theta_i$ in the heading of a vehicle from pulse signals delivered from left and right wheel sensors 11, and enlarges a Kalman gain that a vehicle position and movement estimation unit 16 uses or stops calibrating the scale factors associated with the left and right wheel sensors 11 when the change $\Delta\theta_i$ in the heading of the vehicle becomes larger than a reference value. Thus this embodiment 3 can offer the same advantage as provided by above-mentioned embodiment 2.

Embodiment 4

As previously mentioned, in accordance with above-mentioned embodiment 2, the location equipment calculates the probability of occurrence of slipping of the left and right wheels from the pulse signals from the left and right wheel sensors 11 and the GPS measurement signals received by the GPS receiver 12, and enlarges the Kalman gain that the vehicle position and movement estimation unit 16 uses or stops calibrating the scale factors when the probability $R_{SLIPi}$ of occurrence of slipping of the wheels becomes larger than a reference value. In contrast, a location equipment in accordance with this embodiment 4 calculates an acceleration of a vehicle from GPS measurement signals received by a GPS receiver 12, calculates an acceleration-equivalent value of the vehicle from pulse signals delivered from left and right wheel sensors 11, and enlarges a Kalman gain that a vehicle position and movement estimation unit 16 uses or stops calibrating the scale factors associated with the left and right wheel sensors 11 when the difference between the acceleration and the acceleration equivalent value becomes larger than a reference value. Thus this embodiment 4 can offer the same advantage as provided by above-mentioned embodiment 2.

Embodiment 5

Mention is not made in above-mentioned embodiment 1 of calculating a velocity error $\delta V_i$ involved in the velocity of the vehicle and either an error $\delta\theta'_i$ involved in the heading of the vehicle or an error involved in the change in the heading of the vehicle from the GPS measurement signals received by the GPS receiver 12 and the pulse signals delivered from the left and right wheel sensors 11, and calibrating the wheel track without calibrating the scale factors associated with the left and right wheels when either the error $\delta\theta'_i$ involved in the heading of the vehicle or the error involved in changes in the heading of the vehicle is equal to or larger than a predetermined value even though the velocity error $V_i$ is equal to or smaller than a reference value.

In other words, when a wheel sensor SF calibration unit 14 estimates the error $\delta V_i$ involved in the velocity of the vehicle and the error $\delta\theta'_i$ involved in the heading of the vehicle (in step ST22), the wheel sensor SF calibration unit 14 calibrates the wheel track so that the calibrated wheel track falls within tolerance limits of the wheel track without updating the scale factors associated with the left and right wheel sensors, which are elements of a state value matrix (in step ST24), as described below, when the average error $\delta\theta'_i$ involved in the heading of the vehicle is equal to or larger than the predetermined value even though the velocity error $\delta V_i$, which is an average difference between the velocity of the vehicle and the GPS velocity, is equal to or smaller than a reference value.

$$\text{Tred}_i = \text{Tred}_{typ} + \delta\text{Tred}_i \quad (8)$$

where $\text{Tred}_{typ}$ is the wheel track (i.e., a standard value), and $\text{Tred}_i$ is determined from tolerances of the wheel track. $\text{Tred}_i$ has the same polarity as the error involved in the change in the heading of the vehicle, and is decreased by a predetermined value when the wheels have an insufficient turn angle or is increased by the predetermined value when the wheels have an excessive turn angle.

In accordance with this embodiment 5, the location equipment can measure changes in the heading of the vehicle more accurately.

As previously mentioned, in accordance with this embodiment 5, the location equipment calibrates the wheel track according to equation (8). As an alternative, the location equipment can add the wheel track to each element of the state value matrix for use in the Kalman filter processing intended for the wheel sensor. SF calibration in advance so as to calibrate the wheel track.

Embodiment 6

In above-mentioned embodiment 1, the vehicle position and movement estimation unit 16 is based on the system model given by equation (4), for calculating the current position ($\lambda_i$, $\phi_i$) and heading $\theta_i$ of the vehicle from the distance traveled $D_i$ by the vehicle and the change $\Delta\theta_i$ in the heading of the vehicle, and the measurement model given by equation (5) showing the relationship between the vehicle position ($\lambda_i$, $\phi_i$) obtained by this system model and the GPS position ($\lambda_{GPSi}$, $\phi_{GPSi}$) delivered from the GPS receiver 12, and calculates the current position ($\lambda_i$, $\phi_i$) and heading $\theta_i$ of the vehicle according to the state equation (6), the measurement equation (7), and the Kalman filter equation (3). In contrast, a vehicle position and movement estimation unit 16 in accordance with embodiment 6 uses the following equation (9) showing a relationship between the vehicle position ($\lambda_i$, $\phi_i$) and heading $\theta_i$ obtained by this system model and the GPS position ($\lambda_{GPSi}$, $\phi_{GPSi}$) and GPS heading $\theta_{GPSi}$ delivered from a GPS receiver 12.

$$y_i = H \cdot x_i + v_i \quad (9)$$
$$y_i = [\lambda_{GPSi}, \phi_{GPSi}, \sin\theta_{GPSi}, \cos\theta_{GPSi}]^T$$
$$H = \begin{vmatrix} 1 & 0 & 0 & 0 \\ 0 & 1 & 0 & 0 \\ 0 & 0 & 1 & 0 \\ 0 & 0 & 0 & 1 \end{vmatrix}$$
$$v_i = [\delta\lambda_{GPSi}, \delta\phi_{GPSi}, \sin\delta\theta_{GPSi}, \cos\delta\theta_{GPSi}]^T$$

Position errors ($\delta\lambda_{GPSi}$, $\delta\phi_{GPSi}$) included in a measurement error $v_i$ involved in measurement results obtained using the GPS measurement signals are calculated in the same manner as explained in above-mentioned embodiment 1 (see FIG. 9). A heading error $\delta\theta_{GPS}$ can be defined as a difference between the direction in which the GPS position ($\lambda_{GPS}$, $\phi_{GPS}$) is moved and the GPS heading $\theta_{GPS}$.

Furthermore, when the measurement error $v_i$ is equal to or less than a reference value, by forcedly setting the Kalman gain to 0 or making the location equipment enter a state in which the GPS positioning is disabled, the vehicle position and movement estimation unit 16 can stop bringing the vehicle position and heading of the vehicle calculated from the pulse signals of the wheel sensors close to the GPS position and GPS heading, respectively. As a result, even though the vehicle position calculated from the pulse signals of the wheel sensors is parallel to the GPS position obtained by the GPS receiver, the location equipment can smoothly modify the position and heading of the vehicle calculated from the pulse signals of the wheel sensors without the position calculated from the pulse signals of the wheel sensors overshooting its target. In addition, the location equipment can prevent any decrease in the accuracy of the estimation of the vehicle position and movement because of the GPS position error or the GPS heading error.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for determining the behavior of a vehicle comprising:

wheel sensors installed in left and right wheels of a vehicle, each wheel sensor generating a pulse signal as a corresponding one of the left and right wheels rotates;

a global positioning satellite (GPS) receiver receiving GPS signals sent from GPS satellites;

calibration means for calibrating respective first and second scale factors associated with the left and right wheels, respectively, used for calculating distances traveled by the left and right wheels from the pulse signals delivered from said wheel sensors, based on the GPS signals received by said GPS receiver; and estimation means for estimating vehicle position and movement from the GPS signals received by said GPS receiver and the pulse signals delivered from said wheel sensors using the first and second scale factors calibrated by said calibration means.

2. The apparatus according to claim 1, wherein said calibration means performs Kalman filter processing on the first and second scale factors to calibrate the first and second scale factors.

3. The apparatus according to claim 1, wherein said estimation means performs Kalman filter processing to estimate the vehicle position and movement.

4. The apparatus according to claim 1, wherein said calibration means calibrates the scale factors based on information on heading or velocity of the vehicle included in the GPS signals received by said GPS receiver.

5. The apparatus according to claim 3, wherein said calibration means calculates probability of slipping of the left and right wheels from the GPS signals received by said GPS receiver and the pulse signals delivered from said wheel-sensors, and enlarges Kalman gain that said estimation means uses when the probability of slipping becomes larger than a reference value.

6. The apparatus according to claim 3, wherein said calibration means calculates change in heading of the vehicle from the pulse signals delivered from said wheel sensors, and enlarges Kalman gain that said estimation means uses when the change in heading becomes larger than a reference value.

7. The apparatus according to claim 3, wherein said calibration means determines acceleration of the vehicle from the GPS signals received by said GPS receiver and calculates an acceleration-equivalent value of the vehicle from the pulse signals delivered from said wheel sensors, and enlarges Kalman gain that said estimation means uses when a difference between the acceleration and the acceleration-equivalent value becomes larger than a reference value.

8. The apparatus according to claim 1, wherein said calibration means calculates probability of slipping of the left and right wheels from the GPS signals received by said GPS receiver and the pulse signals delivered from said wheel sensors, and stops calibrating the first and second scale factors when the probability of slipping becomes larger than a reference value.

9. The apparatus according to claim 1, wherein said calibration means calculates change in heading of the vehicle from the pulse signals delivered from said wheel sensors, and stops calibrating the first and second scale factors when the change in heading becomes larger than a reference value.

10. The apparatus according to claim 1, wherein said calibration means determines acceleration of the vehicle from the GPS signals received by said GPS receiver and calculates an acceleration-equivalent value of the vehicle from the pulse signals delivered from said wheel sensors, and stops calibrating the first and second scale factors when difference between the acceleration and the acceleration-equivalent value becomes larger than a reference value.

11. The apparatus according to claim 1, wherein said calibration means calculates error in velocity of the vehicle and one of error in heading of the vehicle and error in change in the heading of the vehicle from the GPS signals received by said GPS receiver and the pulse signals delivered from said wheel sensors, and calibrates a distance between the wheels without calibrating the first and second scale factors when either the error in heading of the vehicle or the error change in heading of the vehicle is at least equal to a predetermined value, even though the error in velocity of the vehicle is no more than a reference value.

12. The apparatus according to claim 3, wherein said estimation means calculates change in bearing of the vehicle and a distance traveled by the vehicle per unit time based on the pulse signals from said wheel sensors and updates position and heading of the vehicle, and modifies the position and heading of the vehicle updated based on information on the position and heading of the vehicle based on the GPS signals received by said GPS receiver.

13. The apparatus according to claim 12, wherein said estimation means stores the information on the position and heading of the vehicle based on the GPS signals, at intervals, calculates a direction in which the vehicle is moved from stored information on the position of the vehicle, and calculates error in the heading of the vehicle from the position information and stored information on the heading of the vehicle.

14. The apparatus according to claim 12, wherein said estimation means stores the information on the position of the vehicle based on the GPS signals, at intervals, and the change in bearing of the vehicle and the distance traveled by the vehicle per unit time calculated based on the pulse signals from said wheel sensors, and calculates error in the information on the position of the vehicle based on the GPS signals by comparing per-unit-time movement vectors obtained from the information on the position of the vehicle the GPS signals and stored, and movement vectors obtained from the change in bearing of the vehicle and stored, and the distance traveled by the vehicle per unit time and stored, respectively.

15. The apparatus according to claim 13, wherein said estimation means stops modifying the position updated and the heading of the vehicle when errors in the position and heading of the vehicle based on the GPS signals received by said GPS receiver become larger than reference values, respectively.

16. The apparatus according to claim 14, wherein said estimation means stops modifying the position updated and the heading of the vehicle when errors in the position and heading of the vehicle based on the GPS signals received by said GPS receiver become larger than reference values, respectively.

17. The apparatus according claim 3, wherein gain of the Kalman filter processing is enlarged if a calculation made by said calibration means produces a result larger than a reference value.

* * * * *